Feb. 27, 1934.  J. A. WEILAND  1,948,954
REFRIGERATOR TRUCK BODY
Filed Sept. 2, 1932  3 Sheets-Sheet 2
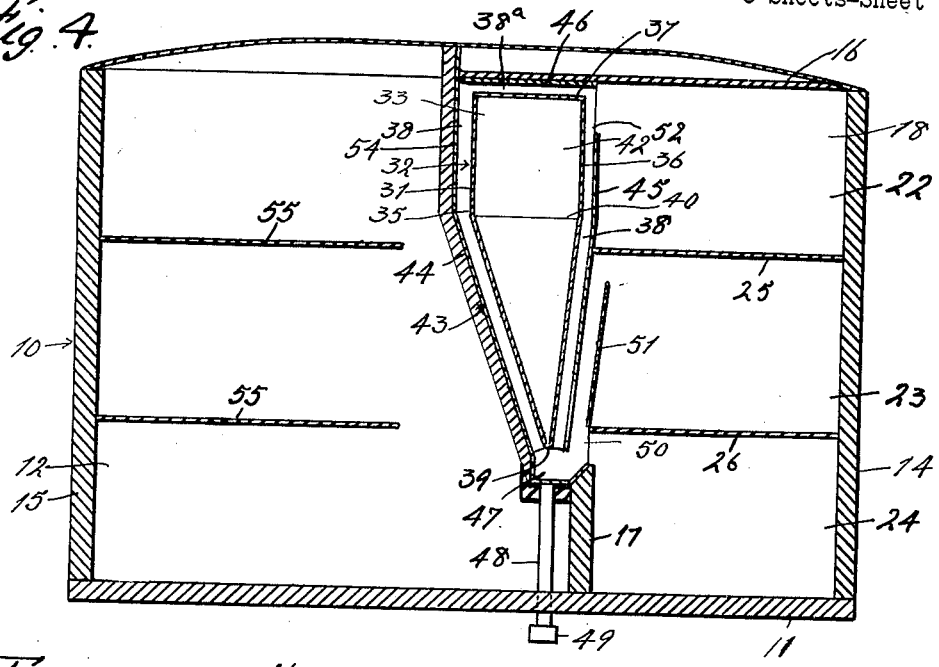
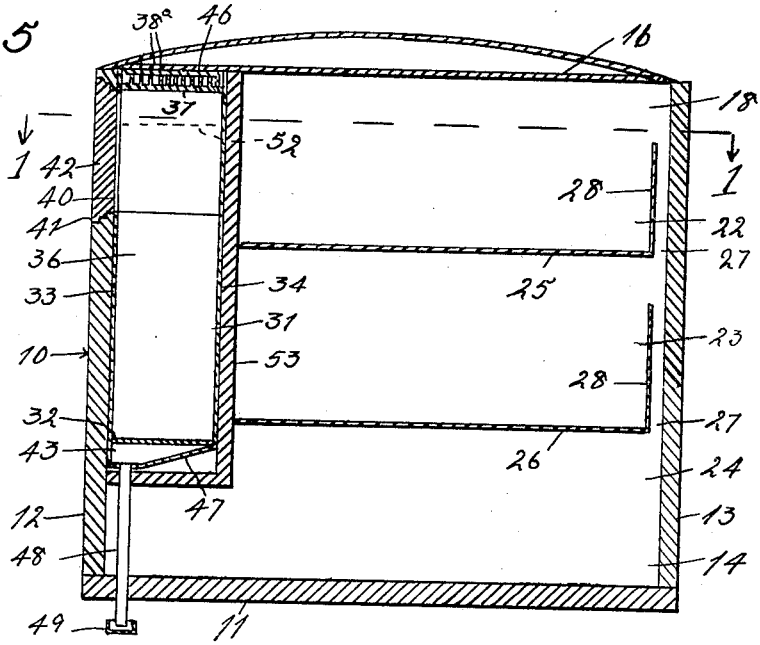
INVENTOR
John Alvin Weiland
By W. W. Williamson
Atty.

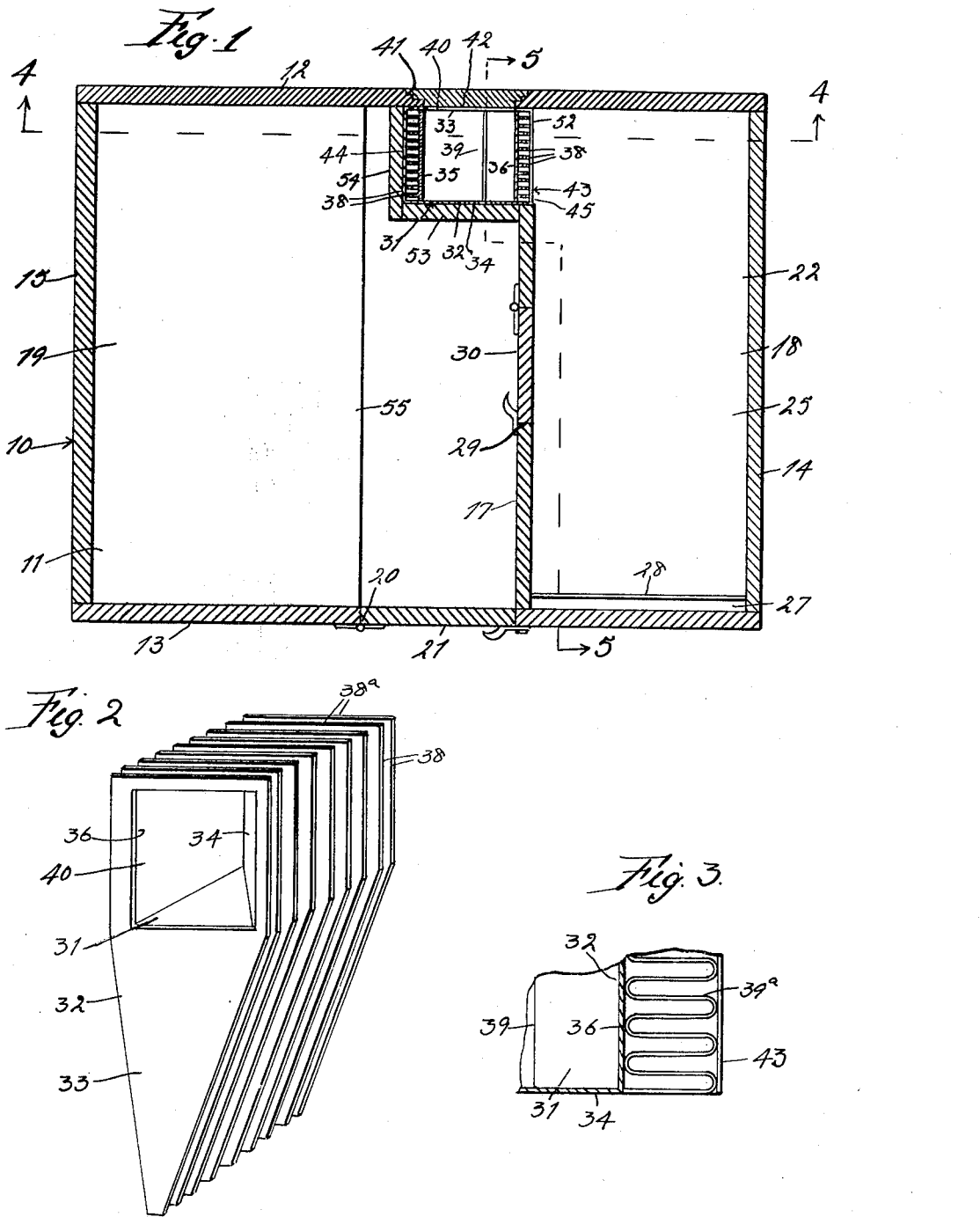

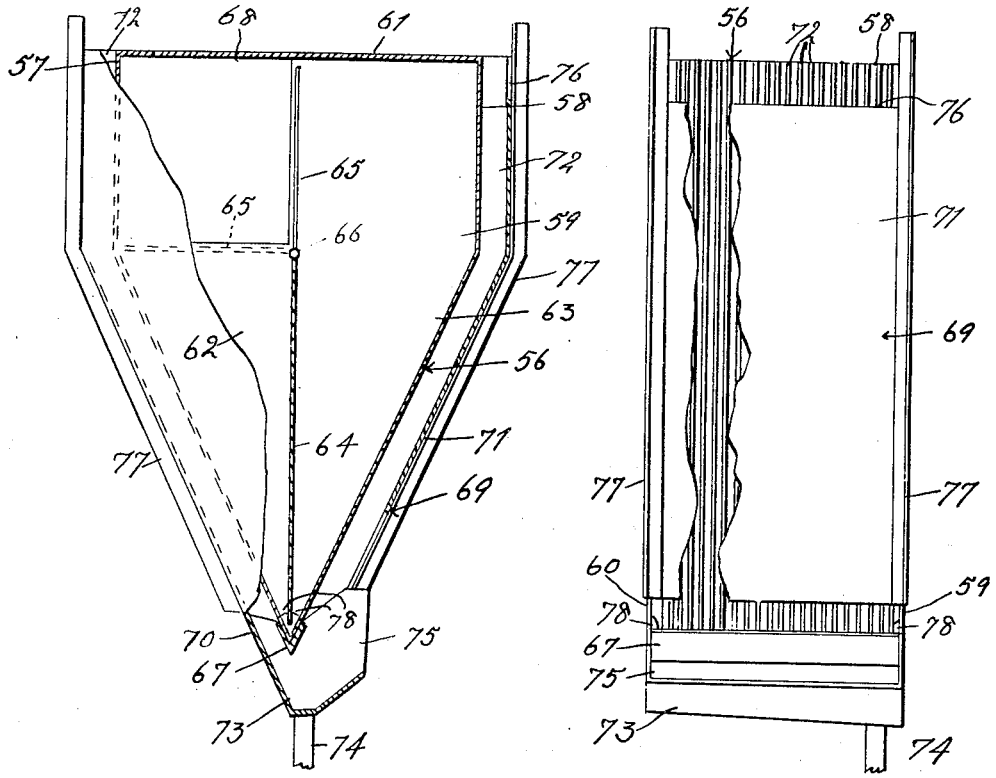

Patented Feb. 27, 1934

1,948,954

UNITED STATES PATENT OFFICE 1,948,954

REFRIGERATOR TRUCK BODY

John Alvin Weiland, Phoenixville, Pa.

Application September 2, 1932. Serial No. 631,474

7 Claims. (Cl. 62—13)

My invention relates to new and useful improvements in refrigerator truck bodies, and more particularly bodies of vehicles such as are used as "traveling stores", or where such vehicles are used for the transportation of food products which must be maintained at a low temperature to prevent them from spoiling, and has for one of its objects to provide a unique ice compartment which will cause the ice to melt or evaporate principally at only two sides, thereby preventing undue shifting of the ice blocks.

Another object of the invention is to provide the ice compartment or bunker with inclined or tapered walls whereby as the ice melts or evaporates, the block will be wedged into a constantly decreasing area so that the melting action will be uniform and surfaces of the ice will be constantly kept in contact with the conductor plates.

Another object of the invention is to provide an ice compartment or bunker in which at least two surfaces of the ice will be maintained constantly in contact with conductor plates until the ice has practically completely melted or evaporated.

Another object of the invention is to so construct the ice compartment or bunker that a block of ice will be maintained at practically its same width because the change in shape takes place principally through the decrease in the thickness thereof.

Another object of the invention is to provide a refrigerator truck body having a plurality of storage compartments, all of which are to be cooled by a circulation of air through said compartments in a particular manner.

Another object of the invention is to provide a device of the kind described with solid shelves to produce a number of compartments for holding food products and to provide means for circulating low temperature air through the several compartments.

A further object of the invention is to provide for the circulation of cool air throughout several compartments of a refrigerator truck body.

A still further object of the invention is to provide a refrigerator truck body divided into two sections, one of which is for storing smoked meat products or other produce not requiring a low temperature and to which section access is had through a door in the right hand side of the body, whereby the salesman or operator may enter the truck from the side facing a street curb, thus subjecting only the non-refrigerated compartment to outside temperatures. The last mentioned section contains the ice compartment at a location preferably opposite the door for the conservation of space and to provide a loading door for said ice compartment on the left hand side of the body to permit icing or loading from the outside. The refrigerated section is divided into a number of compartments by solid shelves which have passageways around them at distant location from the ice compartment, said ice compartment communicating at its lower end with one or more of the lowermost compartments and at its upper end with the uppermost compartment whereby cool air will circulate through the lowermost compartments, then upwardly about certain edges thereof and through the uppermost compartment back to the ice compartment and thence downwardly through said ice compartment. Each of the refrigerating compartments is provided with a door so that only one compartment at a time is subjected to the higher temperature of air contained in the non-refrigerated section.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a horizontal sectional view of a truck body on the line 1—1 of Fig. 4, illustrating a structure for carrying my invention into effect.

Fig. 2 is an enlarged perspective view of one form of ice compartment.

Fig. 3 is an enlarged fragmentary top end view partly in section and partly in elevation of a modified form of ice compartment.

Fig. 4 is a longitudinal vertical section of the truck body on the line 4—4 of Fig. 1.

Fig. 5 is a vertical transverse sectional view on the line 5—5 of Fig. 1.

Fig. 6 is a sectional view of a modified form of ice compartment.

Fig. 7 is a view of said ice compartment partly in section and partly in elevation to illustrate certain details of construction and showing in dotted lines the position which the upper hinged end of the central partition may assume.

Fig. 8 is a view of said ice compartment looking toward the right hand side of Fig. 7, with a portion of the outer plate broken away to illustrate details of construction.

In carrying out my invention as herein embodied, 10 represents the body of a motor truck or other vehicle including a floor 11, side walls 12 and 13, front and rear walls 14 and 15, and a top or ceiling 16.

The interior of the body may be divided into two sections by a partition 17 preferably arranged crosswise of the interior of the body and extending from the floor to the ceiling. For purposes of description, the forward section 18 will be referred to as the refrigerated section while the rear one, designated by the numeral 19, will be referred to as the non-refrigerated section.

In the side wall 13 of the body, which is the street curb side of the vehicle when considered in connection with right hand moving traffic, is formed a door way 20 leading to the non-refrigerated section 19, preferably contiguous to the partition 17 and said door way is normally closed by a door 21. The door is hung in any suitable manner and is provided with any desirable latches and locks.

The refrigerated section 18 may be divided into any desirable number of compartments 22, 23 and 24 by the use of solid horizontal shelves 25 and 26 which are built tight against walls of the vehicle along only three of their edges leaving a space 27 between the fourth edge, and the contiguous wall of the vehicle. As here illustrated, these shelves are fitted air tight to the front wall 14, the side wall 12 and the partition 17 of the vehicle while the remaining edge of each shelf terminates short of the side wall 13 of the vehicle to form the spaces 27 previously referred to.

The spaces 27 are for the circulation of air from one refrigerated compartment to another and to insure a proper circulation of air, a baffle plate 28 is mounted adjacent the free edge of the shelf between the front wall 14 and the partition 17. Each baffle plate is of a desirable height but terminates short of the top of the compartment in which such baffle plate is located which top may be another shelf or the ceiling of the vehicle or possibly only the ceiling of the refrigerated section.

In the partition 17 is formed a door-way 29 for each compartment and is preferably located at a point midway between the side walls of the vehicle and each door-way is normally closed by a door 30 hung in any approved manner and provided with any suitable latches or fastening devices.

At the left hand side of the body is located the ice bunker 31 comprising an inner casing 32 consisting of side walls 33 and 34 as well as end walls 35 and 36 and a top wall 37. While the upper ends of all of the walls may be straight or perpendicular, the lower ends of all or some of said walls are inclined so that they converge toward each other toward their lower ends or toward another or others of said walls.

For convenience of description, I have shown only the end walls 35 and 36 having their lower ends converging toward each other and the angles of convergence may be the same in both walls or they may be different as shown in Fig. 4. In the embodiment of the invention being described, the end walls 35 and 36 are the conductor plates and they may be of any desirable formation, although preferably flat and provided with radiating fins 38 or corrugations 39a.

At the lower end of the inner casing is a water outlet 39 provided by forming apertures in the walls of said inner casing or by leaving the lower edges of the end walls 35 and 36 in slightly spaced relation and in the upper end of the side wall 33 is formed an opening 40 for registration with the ice loading door-way 41 formed in the body side wall 12, whereby a cake or cakes of ice may be loaded into the ice bunker and said door-way 41 is normally closed by the door 42.

Surrounding the inner casing is an outer casing 43, particularly comprising end walls 44 and 45, and if desirable, a top wall 46. Of course said outer casing may also include side walls although these are not essential because by experience I have found that sufficient circulation is provided through the two sets of radiating means along the end walls, but this depends to a great extent on the area of the refrigerated compartments and the temperature which it is desired to maintain them.

The bottom part of the outer casing is fashioned to provide a trough 47 to receive any condensation running down the outside conductor plates or end walls of the inner chamber and ice water originating from the melting ice, the said trough being properly inclined so that water may flow therethrough to a drain pipe 48 leading through the floor or any other wall of the vehicle body to any suitable place or location of disposal, and the lower end of said drain pipe may have a cup trap 49 thereon to prevent the passage of warm air through the drain pipe.

The lower part of the outer casing and more particularly the lower part of the end wall 45 has an opening 50 therein communicating with one or more of the lower refrigerated compartments, as for instance, compartments 23 and 24 and since the opening 50 communicates with the lower part of the compartment 23, a screen 51 may be disposed across that part of the opening 50 which communicates with the compartment 23 to prevent produce or other articles placed within said compartment 23 from falling into the space between the inner and outer casings.

At the upper end of the outer casing is also formed an opening 52 which communicates with the uppermost refrigerated compartment 22 and preferably the upper part thereof.

The two sides, the rear end and the top of the ice bunker may be insulated by the walls of the truck body or by other insulation or by the body walls and other insulation, but for convenience of illustration, we will assume that the side 33 is insulated by the side wall 12 of the truck body while the top thereof is insulated by the ceiling 16, in which case the side 32 and the end 35 is insulated by additional insulating means or walls 53 and 54.

I have explained that the outer casing may include a top wall 46 but it will be understood that this may be eliminated and the ice bunker fitted in place so that the end walls of the outer casing and the several radiating means or fins will engage the ceiling 16 and provide the necessary space for air circulation. Also the radiating means or fins may be provided along only the end walls of the inner casing or they may be extended across the top wall thereof, if desired as indicated at 38a.

It has been found in actual practice that where slat shelves are used in refrigerated compartments, said compartments cannot be ordinarily maintained at the desired low temperature, especially when starting out at the beginning of a day's work because when such compartments are loaded with meat products or other articles the spaces between the slats will be closed and no air can circulate through the compartments. This disadvantage is overcome by my invention because the spaces between the edges of the several shelves and the adjacent wall of the track body can never be closed by products resting on the shelves due to the fact that the baffle plates act as barriers and protect the spaces from being covered with products placed on the shelves.

Another advantage of the construction herein described is the arrangement and location of the side door which permits the salesman or operator to step into the truck on the side generally facing the street curb.

With most refrigerated truck bodies a great amount of refrigeration or cool air is lost at the time the salesman steps into the body because generally the door opens directly into the refrigerated section. The effectiveness of the refrigerating system in many cases is decreased due to the fact that smoked meats and other articles which do not need a low temperature are mixed with fresh meats and other food products requiring low temperature. These disadvantages are overcome by separating the two different kinds of products and providing a section of the truck body for each of said kinds of products. This I accomplish by dividing the interior of the body into two sections and refrigerating only one of said sections and so locating the entrance door that the salesman steps into the non-refrigerated section and then removes any product desired from the refrigerated section. By this arrangement, the outside air, which is naturally the highest temperature, will only enter the non-refrigerated section and since this section is shaded by the walls of the body, the temperature of the air therein will be somewhat lower than the temperature of the outside air. Then when it is necessary to obtain access to the refrigerated section, only a certain amount of the air from the non-refrigerated section can mix with the air of lower temperature in the refrigerated section, and this will be still further limited where the refrigerated section is divided into a number of compartments.

Where a merchant carries two classes of products, the construction herein described is the preferred one, but it will be obvious that if a merchant carries but one kind of product, namely fresh meats, the entire interior of the truck body can be refrigerated in the same manner described herein.

Assuming that warm air enters the spaces between the inner and outer casings, said warm air will contact with the conductor plates or end walls 35 and 36 of the inner casing and the radiating means thereon so that the heat in said air will be absorbed reducing the temperature thereof and causing it to pass downward through the ice bunker or between the spaced end walls of the inner and outer casings after which it will pass through the opening 50 into the compartments 23 and 24 at the rear and to one side thereof as will be obvious by reference to Fig. 1. Upon entering the said compartments, it will flow forwardly relative to the truck body and toward one side thereof, thence through the opening 27 and upwardly along the inside of the side wall 13 between the latter and the baffle plates, finally entering the uppermost compartment 22 through which it will travel in a reversed direction back toward the ice bunker and enter the air spaces in said ice bunker through the opening 50.

The ice does not come into direct contact with the circulating air but the cooling action is accomplished by the air contacting the end walls of the inner casing and the radiating means, and since the ice is in contact with said end walls of the inner casing it naturally melts more rapidly along its areas of contact with the said end walls. This causes uniform melting along two sides but since there is no circulation of air about the other two sides of the inner casing and said sides being insulated, the ice does not melt so rapidly along said two other sides, and therefore the ice keeps almost its full width during the change in thickness and therefore the effectiveness of the entire width of both end walls of the inner casing are maintained even though the original cake of ice loses almost all its weight.

Because of the inclined lower portions of the walls, it is possible to load a cube of ice in the top of the ice compartment and let it melt and slide down into the compartment and therefore will always remain in contact with the end walls of the inner casing which act as conductor plates.

While I have said nothing in particular about the interior construction of the non-refrigerated section, it will be obvious that if desired this section may also be provided with shelves 55.

In Figs. 6 to 8 inclusive, I have shown a slightly modified form of ice bunker wherein the inner casing 56 includes a pair of end walls 57 and 58, the lower portions of which are inclined so as to converge toward each other and provide a tapered ice receiving chamber, side walls 59 and 60 and a top wall 61.

The interior of said inner casing is divided into two ice compartments 62 and 63 by a vertical transverse central partition 64 which may be welded or otherwise secured to the side walls 59 and 60 and the lower parts of the end walls 57 and 58. This partition terminates short of the top of the casing and approximately on a line with the upper ends of the inclined lower parts of the end walls, and to the upper edge of said partition 64 is hinged a supplementary partition 65 as at 66 so that when in an upright position, where it may be held by a suitable latch, it forms a continuation of the central partition and positively separates one ice compartment from the other.

The lower edges of the end walls 57 and 58 may be enclosed within a small angle iron 67 welded or otherwise secured thereto for assisting in holding said end walls and other component parts in place.

In one of the side walls, as 59, is formed an ice filling or loading opening 68, preferably communicating with only one of the ice compartments as 62 at the upper end thereof. When loading the ice compartment 63, the supplementary hinged partition 65 may be swung down to a position such as illustrated by dotted lines in Fig. 7, and the ice may then be inserted through the opening 68 and laid upon the supplementary partition 65, while the latter is in a horizontal position and then pushed over into the ice compartment 63. After said ice compartment 63 has been loaded, the supplementary partition 65 is swung back to its vertical position and the ice compartment 62 can then be directly loaded and since none of the ice in the two compartments can contact with each other they cannot freeze to one another and possibly cause the whole filling to be suspended in the air from the upper edge of the central partition.

With this particular arrangement of ice bunker, each cake of ice melts practically along only one surface so that contact of the cake of ice with the end wall or conductor plates is likely to be more positive and if there is any differential absorption of heat between the front and rear ends of the bunker such condition will be readily taken care of and if necessary only one compartment need be refilled.

An outer casing 69 which may include end, side and top walls is herein illustrated as comprising only end walls 70 and 71, which are spaced from the end walls of the inner casing to provide air passageways running vertically of the device and in which are located the radiating fins 72 or other equivalent heat radiating means.

The outer casing has its lower portion fashioned to produce a trough 73 which may be inclined from one side to the other as shown in Fig. 8, and from which will lead a drain pipe 74 provided with any suitable trap as suggested in connection with the first described form of my invention.

The lower portion of the outer casing has an air outlet 75 for communication with one or more of the refrigerated compartments of the truck body and the upper end of the end wall 71 terminates short of the upper end of the end wall 70 or the top of the inner casing to provide an air inlet 76 communicating with the uppermost one of the refrgerated compartments. The entire structure may be braced and strengthened by angle irons 77 located at the four corners and welded or otherwise secured in place.

It is unnecessary that the inner casing be water tight, but to insure an outlet for the ice water, apertures 78 are provided which will permit said water to flow from the inner casing into the outer casing and more particularly into the trough thereof to be directed to a place of disposal by means of the drain pipe 74. It is preferred that the apertures 78 be at or adjacent the side walls so that when the water runs from the inner casing it will flow down the side walls into the trough and not cause a splash which might pass through the outlet 75 into the refrigerated compartments.

One of the main features of my invention is the ice loading advantage due to the tapered construction or decreasing cross sectional area of the ice compartment or bunker. As the ice melts it descends in the bunker and when the space above the ice in the bunker is large enough to receive another cake of ice, the latter may be loaded by inserting the same at the top of the bunker without removing or changing the position of the ice remaining in the bunker from the previous loading.

Of course I do not wish to be limited to the exact details of construction herein shown and described as these may be varied within the limits of the appended claims without departing from the spirit of my invention.

Having thus fully described my invention, what I claim as new and useful is:—

1. A refrigerator truck body, comprising in combination, a truck body divided into two sections one of said sections having a door leading thereto from the outside of the body and the other section being accessible from the first mentioned section, an ice bunker located within the second mentioned section at a place distant from the door leading to the interior of the body, said bunker having inclined walls whereby gravity will cause ice to maintain constant contact with said inclined walls, said ice bunker having air passageways along the inclined walls communicating at their lower ends with the lower portion of the second mentioned section and also communicating at their upper ends with the upper portion of said second mentioned section.

2. The structure set forth in claim 1, in combination with shelves to divide the second mentioned section of the truck body into several superimposed compartments, each shelf having one edge terminating short of the contiguous wall of the body to form an air passageway and a baffle plate the full length of the free edge of each shelf mounted adjacent said free edge and extending upwardly from the shelf.

3. The combination of a vehicle body with a door in one side thereof, a partition crosswise of the interior of the body dividing the latter into two sections, one to be a refrigerated section and the other to be a non-refrigerated section and said non-refrigerated section embracing the door, shelves dividing the refrigerated section into a plurality of compartments, each having a door leading thereto through the partition from the non-refrigerated section, said shelves terminating short of a wall of the truck body providing vertically aligned passageways from one compartment to another, baffle plates along the free edges of said shelves to guide currents of air through the several compartments, an ice bunker within the refrigerated section at the side of the body opposite the door and built into the partition, said bunker including an inner casing having a tapered lower portion and an outer casing providing with said inner casing air passageways communicating at their lower ends with the lower compartments in the refrigerated section and also communicating at their upper ends with the uppermost compartment of the refrigerated section whereby a constant circulation of air is provided through the several compartments in the refrigerated section, said bunker having a filling opening at one side near its upper portion in alignment with an ice loading door in the contiguous side of the truck body, and means to dispose of the water from the ice bunker.

4. In a device of the kind described, an ice bunker comprising an inner casing including end walls converging toward their bottoms and straight insulated side walls and a top wall, radiating means carried by the top and end walls, means to enclose said radiating means to provide air passageways having an inlet leading thereto and an outlet leading therefrom, and means to dispose of the water from the ice bunker.

5. An ice bunker comprising an inner casing including end walls converging toward their bottoms and straight insulated side walls, radiating means mounted on said end walls, and an outer casing enclosing said radiating means and forming inclined air passageways, said outer casing having an air inlet at the top thereof and an air outlet at the bottom of the same.

6. In a device of the kind described, an ice bunker comprising an inner casing including end walls having their lower parts converging toward their bottoms and straight insulated side walls, said inner casing having an ice water outlet therefrom at the bottom, radiating means carried by the end walls, means to enclose said radiating means to provide air passageways, said enclosing means having an air inlet at its upper portion and an air outlet at its lower portion, and a trough having an outlet leading therefrom and underlying the bottom of the inner casing to catch drippings from said inner casing.

7. The structure set forth in claim 6, in combination with a central partition to partially divide the interior of the inner casing into two compartments, and a supplementary partition hinged to the upper end of the main partition for separating the upper parts of the ice compartments from each other, said inner casing having an access opening leading to the upper end of only one of the ice compartments.

JOHN ALVIN WEILAND.